(12) United States Patent
Zheng

(10) Patent No.: US 10,433,039 B2
(45) Date of Patent: Oct. 1, 2019

(54) HOUSING FOR TERMINAL, TERMINAL AND MOBILE PHONE

(71) Applicant: GUANGDONG OPPO MOBILE TELECOMMUNICATIONS CORP., LTD., Dongguan (CN)

(72) Inventor: Xiaodong Zheng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 51 days.

(21) Appl. No.: 15/634,129

(22) Filed: Jun. 27, 2017

(65) Prior Publication Data

US 2018/0152775 A1 May 31, 2018

(30) Foreign Application Priority Data

Nov. 25, 2016 (CN) .......................... 2016 1 1062768
Nov. 25, 2016 (CN) ..................... 2016 2 1294494 U

(51) Int. Cl.
*H04R 9/06* (2006.01)
*H04R 5/02* (2006.01)
*H04R 1/02* (2006.01)
*G06F 3/041* (2006.01)
*H04M 1/03* (2006.01)
*H04M 1/18* (2006.01)

(52) U.S. Cl.
CPC ............. *H04R 1/025* (2013.01); *G06F 3/041* (2013.01); *H04M 1/035* (2013.01); *H04M 1/18* (2013.01); *H04R 1/023* (2013.01); *H04R 2499/11* (2013.01)

(58) Field of Classification Search
CPC ........ H04R 1/2857; H04R 1/30; H04R 1/026; H04R 1/323; H04R 1/345; H04R 2499/11; H04M 1/035
USPC ........................................... 381/87, 332–337
See application file for complete search history.

(56) References Cited

U.S. PATENT DOCUMENTS 3,869,954 A * 3/1975 Ito ............................ G10D 1/08
84/291
2009/0111540 A1* 4/2009 Inoue ................... H04M 1/0216
455/575.3

(Continued)

FOREIGN PATENT DOCUMENTS

CN 202679624 U 1/2013
CN 203219365 U 9/2013

(Continued)

OTHER PUBLICATIONS

PCTCN2017089640 International search report and written opinion dated Sep. 22, 2017, 12 pages.

(Continued)

*Primary Examiner* — George C Monikang
(74) *Attorney, Agent, or Firm* — Lathrop Gage LLP

(57) ABSTRACT

A housing for a terminal and a terminal are provided. The housing defines a mounting chamber configured to accommodate an electroacoustic component and a sound output hole in communication with the mounting chamber, the sound output hole having a first end and a second end, the first end being adjacent to the mounting chamber and defining a first opening, the second end being away from the mounting chamber and defining a second opening, the first opening having a cross sectional area of larger than a cross sectional area of the second opening.

20 Claims, 2 Drawing Sheets

(56) References Cited

U.S. PATENT DOCUMENTS

| | | | |
|---|---|---|---|
| 2011/0255726 A1 | 10/2011 | Yu et al. | |
| 2012/0177237 A1 | 7/2012 | Shukla et al. | |
| 2013/0070948 A1* | 3/2013 | Lee ........................ | H04M 1/04 381/334 |

FOREIGN PATENT DOCUMENTS

| | | |
|---|---|---|
| CN | 103931210 A | 7/2014 |
| CN | 204559678 U | 8/2015 |
| CN | 204795947 U | 11/2015 |
| CN | 106101950 A | 11/2016 |
| CN | 106453756 A | 2/2017 |
| CN | 206195884 U | 5/2017 |
| EP | 1739933 A1 | 1/2007 |

OTHER PUBLICATIONS

European Patent Application No. 17177787.3 extended search and opinion dated Dec. 7, 2017, 7 pages.

\* cited by examiner

HOUSING FOR TERMINAL, TERMINAL AND MOBILE PHONE

CROSS-REFERENCE TO RELATED APPLICATION

This application claims priority to and benefits of Chinese Patent Application No. 201611062768.7, filed with State Intellectual Property Office on Nov. 25, 2016, and Chinese Patent Application No. 201621294494.X, filed with State Intellectual Property Office on Nov. 25, 2016, the entire content of which is incorporated herein by reference.

FIELD

The present disclosure relates to a field of communication technology, and particularly, to a housing for a terminal and a terminal.

BACKGROUND

In the related art, a mobile terminal (like a mobile phone) is equipped with an electroacoustic component, and a sound from the electroacoustic component is transmitted through a through hole in a housing for the terminal. Since a sound output hole is in communication with the outside, if the sound output hole is too large, impurities (such as dust) from the outside can easily enter the housing from the sound output hole, thereby causing damages to parts in the housing; if the sound output hole is too small, the sound from the electroacoustic component is difficult to be transmitted through the sound output hole, hence lowering a sound volume of the electroacoustic component or even resulting in silence, thereby degrading user experience.

SUMMARY

The present disclosure provides a housing for a terminal. The housing according to embodiments of present disclosure defines a mounting chamber configured to accommodate an electroacoustic component and a sound output hole in communication with the mounting chamber, in which a first end of the sound output hole adjacent to the mounting chamber defines a first opening, and a second end of the sound output hole away from the mounting chamber defines a second opening, the first opening is larger than the second opening.

The present disclosure further provides a terminal that includes the above housing. The terminal according to embodiments of present disclosure includes: the housing configured as the housing described above; an electroacoustic component having a sound output portion and embedded in the mounting chamber, the sound output portion of the electroacoustic component being corresponding to the sound output hole; and a second dustproof mesh attached to the sound output portion.

The present disclosure furthermore provides a mobile phone. The mobile phone, comprising a housing, a PCB, a memory, an input unit, a sensor and a electroacoustic component, the housing defining a chamber, the PCB, the memory, the input unit and the sensor being arranged in the chamber, and the memory being arranged on and electrically connected to the PCB; and the housing defining a mounting chamber configured to accommodate the electroacoustic component and a sound output hole in communication with the mounting chamber, the sound output hole having a first end and a second end, the first end being adjacent to the mounting chamber and defining a first opening, the second end being away from the mounting chamber and defining a second opening, and the first opening being larger than the second opening.

DETAILED DESCRIPTION

Figure 1:
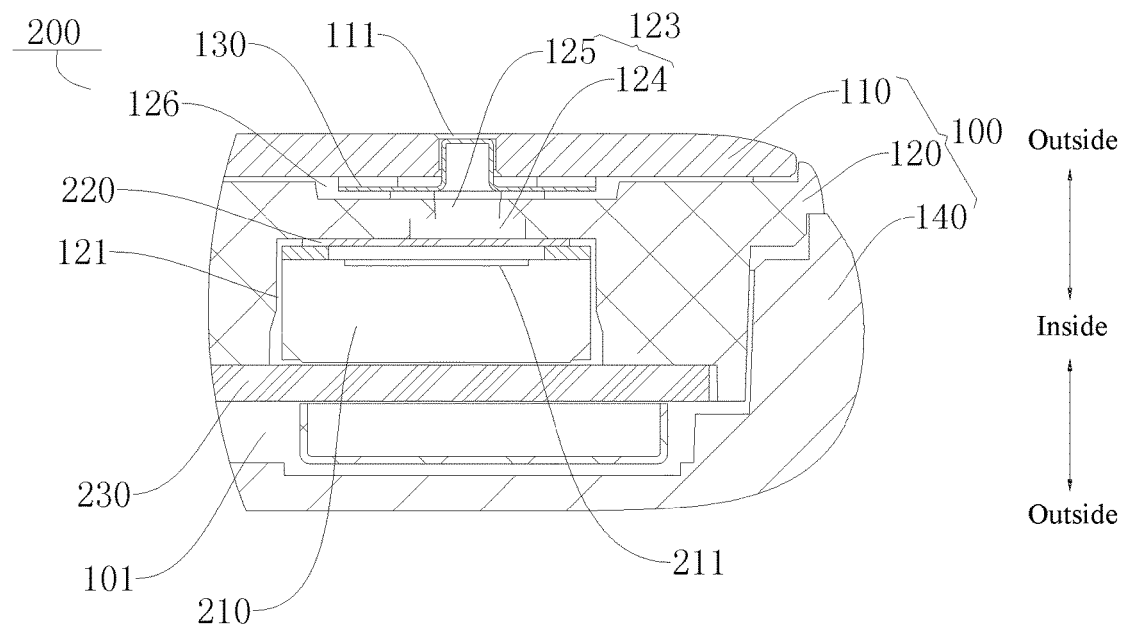
FIG. 1 is a partial schematic view of a terminal according to an embodiment of the present disclosure.

Reference will be made in detail to embodiments of the present disclosure. Examples of the embodiments are illustrated in the drawings. The embodiments described herein with reference to drawings are explanatory, and used to interpret the present disclosure. The embodiments shall not be construed to limit the present disclosure.

In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "axial," "radial" and "circumferential" should be construed to refer to the orientations or positions as described or as illustrated in the drawings under discussion. These relative terms are for convenience of description and do not indicate or imply that the device or element referred to must have a particular orientation or be constructed or operated in a particular orientation. Thus, the relative terms shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" can comprise one or more of this feature. In the description of the present disclosure, "a plurality of" means two or more than two, unless specified otherwise.

In the present disclosure, unless specified or limited otherwise, the terms "mounted", "connected", "coupled", "fixed" and the like are used broadly, and can be, for example, fixed connections, detachable connections, or integral connections; can also be mechanical or electrical connections or communicated with each other; can also be direct connections or indirect connections via intervening structures; can also be inner communications or mutual interaction of two elements, which can be understood by those skilled in the art according to specific situations.

In the following, a housing 100 for a terminal 200 according to embodiments of the present disclosure will be described with reference to FIGS. 1 to 4. Components for performing various functions of the terminal 200 can be placed in the housing 100. It should be noted that the terminal used herein (also referred to as a communication terminal) includes, but is not limited to, a device configured to be connected via a wired connection (such as a public switched telephone network (PSTN), a digital subscriber line (DSL), a digital cable, a direct cable connection, and/or another data connection/network) and/or receive/transmit a communication signal via a wireless interface (e.g., for a cellular network, a wireless local area network (WLAN), a digital television network such as a DVB-H network, a satellite network, an AM-FM broadcast transmitter, and/or another communication terminal). The terminal configured to communicate via the wireless interface can be referred to as "a wireless communication terminal," "a wireless terminal" and/or "a mobile terminal." Examples of the mobile terminal include but are not limited to a satellite or cellular telephone; a personal communication system (PCS) terminal capable of combining cellular radiotelephone with data processing, facsimile and data communication capabilities; a PDA integrated with a radiotelephone, a pager, an Internet/Intranet access, a Web browser, a notebook, a calendar, and/or a global positioning system (GPS) receiver; and conventional laptop and/or palmtop receivers or other electronic devices including radiotelephone transceivers.

Figure 2:
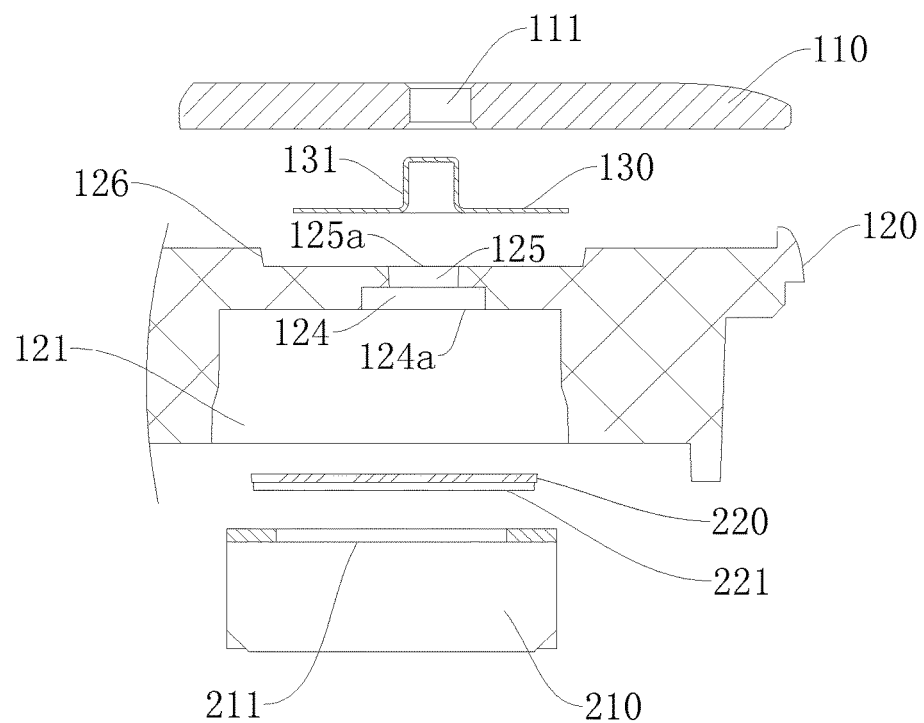
FIG. 2 is an exploded view of a terminal according to an embodiment of the present disclosure.

FIGS. 1 to 4 illustrate the housing 100 for the terminal 200 according to embodiments of the present disclosure, the housing 100 defines a mounting chamber 121 configured to accommodate an electroacoustic component 210. As illustrated in FIG. 2, the housing 100 defines a sound output hole 123 in communication with the mounting chamber 121. When assembled, a sound output portion 211 of the electroacoustic component 210 can be arranged opposite to the sound output hole 123, such that a sound from the electroacoustic component 210 can be transmitted smoothly through the sound output hole 123. A first end of the sound output hole 123 adjacent to the mounting chamber 121 defines a first opening 124a, and a second end of the sound output hole 123 away from the mounting chamber 121 defines a second opening 125a. That is, the first end of the sound output hole 123 is in communication with the outside through the second opening 125a ("the outside" here should be interpreted in a broad sense, and refer to a space spaced apart from the mounting chamber 121 and located outside the mounting chamber 121), and the second end of the sound output hole 123 is in communication with the mounting chamber 121 through the first opening 124a.

In the related art, since the sound output hole 123 is in communication with the outside, if the sound output hole 123 is too large, impurities (such as dust) from the outside can easily enter the housing 100 from the sound output hole 123 or accumulate at the sound output hole 123, thereby causing damages to parts in the housing 100 or blocking the sound output hole 123. If the sound output hole 123 is too small, the sound from the electroacoustic component 210 is difficult to be transmitted through the sound output hole 123, hence lowering a sound volume of the electroacoustic component 210 or even resulting in silence, thereby degrading user experience. As illustrated in FIGS. 1 to 4, the first opening 124a is larger than the second opening 125a, such that the sound can be transmitted out smoothly through the sound output hole 123, and the outside dust can be prevented from entering the housing 100 through the sound output hole 123.

For the housing 100 for the terminal 200 according to embodiments of the present disclosure, by configuring the first opening 124a, adjacent to the mounting chamber 121, of the sound output hole 123 to be larger than the second opening 125a, away from the mounting chamber 121, of the sound output hole 123, it is possible to transmit the sound out smoothly through the sound output hole 123 and prevent the outside dust from entering the housing 100 through the sound output hole 123 or prevent the dust from accumulating at the sound output hole 123, so as to improve dustproof performance of the housing 100, reduce blockage of the housing 100 against the sound output, and increase the sound volume of the terminal 200.

According to an embodiment of the present disclosure, as illustrated in FIGS. 1 to 4, a cross sectional area of the first opening 124a is larger than a cross sectional area of the second opening 125a, such that it is possible to transmit the sound out smoothly through the sound output hole 123 and prevent the outside dust from entering the housing 100 through the sound output hole 123 or prevent the dust from accumulating at the sound output hole 123.

Figure 4:
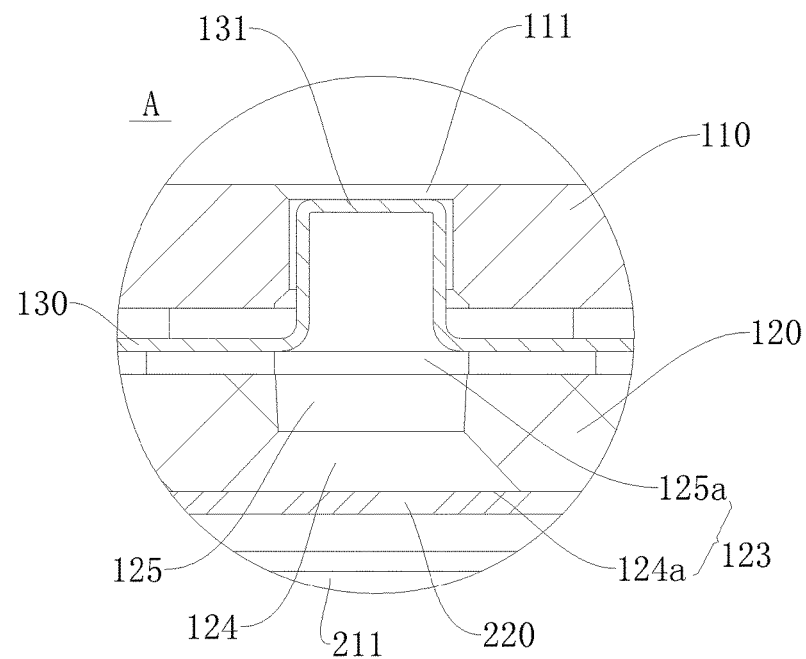
FIG. 4 is a partial schematic view of part A in FIG. 3.

According to an embodiment of the present disclosure, as illustrated in FIGS. 2 and 4, the sound output hole 123 can include a first hole segment 124 and a second hole segment 125. A first end of the first hole segment 124 is constructed as the first opening 124a, a first end of the second hole segment 125 is in communication with a second end of the first hole segment 124, and a second end of the second hole segment 125 is constructed as the second opening 125a. A cross sectional area of the first hole segment 124 is larger than a cross sectional area of the second hole segment 125, such that the first hole segment 124 can be utilized to collect the sound and transmit the sound to outside the mounting chamber 121, and the second hole segment 125 can be utilized to keep the impurities (such as dust) outside the housing 100, thereby improving the dustproof performance of the housing 100, and reducing the blockage of the housing 100 against the sound output.

Figure 3:
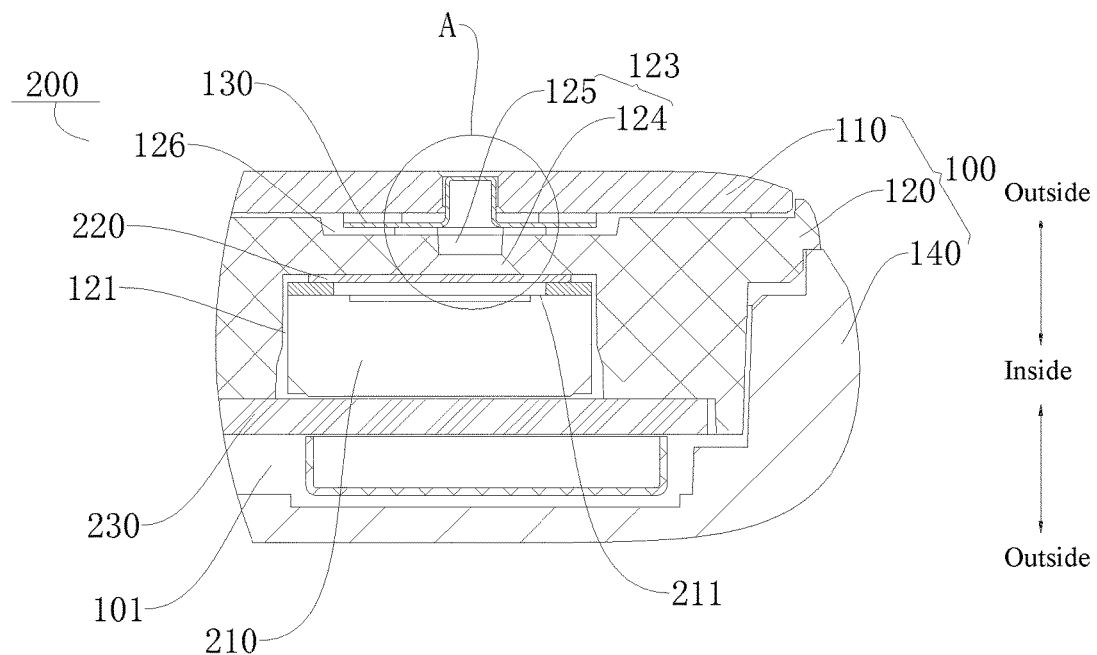
FIG. 3 is a partial schematic view of a terminal according to an embodiment of the present disclosure.

According to an embodiment of the present disclosure, as illustrated in FIGS. 3 to 4, in a direction from the first opening 124a to the second opening 125a, the cross sectional area of the first hole segment 124 is gradually decreased. Thus, it is not only possible to effectively prevent the dust from accumulating at the sound output hole 123, thereby reducing the possibility that the impurities (such as dust) block the sound output hole 123, but also a sound output area is increased, thereby reducing the blockage of the housing 100 against the sound output.

It should be noted that a shape of the first hole segment 124 is not limited thereto. For instance, in another example of the present disclosure, the cross sectional area of the first hole segment 124 and that of the second hole segment 125 are both constant. That is, the cross sectional area of the first hole segment 124 at any position is S1, and the cross sectional area of the second hole segment 125 at any position is S2, in which S1>S2. Therefore, a machining process can be simplified, and a production cost can be saved. Further, the first hole segment 124 and the second hole segment 125 are configured as circular holes, thus further simplifying the machining process of the sound output hole 123.

According to an embodiment of the present disclosure, the cross sectional area of the first opening 124a is S1, and the cross sectional area of the second opening 125a is S2, in which S1 and S2 satisfy $0.1 \leq S2/S1 \leq 0.4$. Therefore, it is not only possible to effectively prevent the dust from accumulating at the sound output hole 123, thereby reducing the possibility that the impurities (such as dust) block the sound output hole 123, but also the sound output area is increased, thereby reducing the blockage of the housing 100 against the sound output. Further, it is verified through tests that when S1 and S2 satisfy $0.2 \leq S2/S1 \leq 0.3$, a better effect of preventing the dust from accumulating at the sound output hole 123 can be achieved, and the blockage of the housing 100 against the sound output is further reduced.

According to an embodiment of the present disclosure, as illustrated in FIGS. 1 to 4, the housing 100 can include a display screen cover plate 110, a front cover 120, a first dustproof mesh 130 and a rear cover 140. The display screen cover plate 110 defines a through hole 111 and is embedded in the front cover 120, and the sound output hole 123 is provided in the front cover 120. As illustrated in FIGS. 2 and 4, the sound output hole 123 is opposite to and in communication with the through hole 111, and hence the sound can be transmitted outside the housing 100 through the sound output hole 123. The first dustproof mesh 130 is interposed between the front cover 120 and the display screen cover plate 110 to make the through hole 111 spaced apart from the sound output hole 123, thus preventing the impurities (such as dust) from entering the sound output hole 123.

Further, as illustrated in FIG. 2, the first dustproof mesh 130 can have a bent portion 131, and the bent portion 131 extends into the through hole 111 to further prevent the impurities (such as dust) from entering the sound output hole 123. As illustrated in FIG. 2, the housing 100 defines an embedding groove 126 at a side wall towards the display screen cover plate 110, and an edge of the first dustproof mesh 130 can be embedded into the embedding groove 126, such that a structure of the housing 100 becomes more compact and reasonable. As illustrated in FIGS. 1 and 3, the rear cover 140 and the front cover 120 define a chamber 101, and the mounting chamber 121 is defined in the front cover 120 and is in communication with the chamber 101. It should be noted that components of the terminal 200, such as a PCB 230 and a battery, can be placed in the chamber 101, and the electroacoustic component 210 can be electrically connected to the PCB 230.

The terminal 200 according to embodiments of the present disclosure will be described with reference to FIGS. 1 to 4. The terminal 200 includes the electroacoustic component 210, a second dustproof mesh 220 and the housing 100 as discussed above.

Specifically, the electroacoustic component 210 is embedded in the mounting chamber 121, the sound output portion 211 of the electroacoustic component 210 is opposite to the sound output hole 123, and hence the sound from the electroacoustic component 210 is transmitted outside the housing 100 through the sound output hole 123. The second dustproof mesh 220 is attached to the sound output portion 211 of the electroacoustic component 210, so as to further prevent the impurities (such as dust) from coming into contact with the electroacoustic component 210 or entering the mounting chamber 121.

For the terminal 200 according to embodiments of the present disclosure, by configuring the first opening 124a, adjacent to the mounting chamber 121, of the sound output hole 123 to be larger than the second opening 125a, away from the mounting chamber 121, of the sound output hole 123, it is possible to transmit the sound out smoothly through the sound output hole 123 and prevent the outside dust from entering the housing 100 through the sound output hole 123, so as to improve the dustproof performance of the housing 100, reduce the blockage of the housing 100 against the sound output, and increase the sound volume of the terminal 200.

According to an embodiment of the present disclosure, as illustrated in FIG. 2, an adhesive layer 221 is provided between the second dustproof mesh 220 and the electroacoustic component 210, such that the second dustproof mesh 220 can be firmly mounted between the electroacoustic component 210 and the housing 100.

The terminal 200 according to embodiments of the present disclosure will be described in detail with reference to FIGS. 1 to 4 in two particular examples. It could be understood that the following description is only explanatory and shall not be construed to limit the present disclosure.

For the convenience of description, a mobile phone is taken as an example of the terminal 200 of the present disclosure. In this embodiment, the mobile phone can include the housing 100, the PCB 230, the battery, a memory, an input unit, a wireless fidelity (Wi-Fi) module, a sensor, an audio circuit, a processor, a projection unit, a shooting unit and other components. The housing 100 defines the chamber 101 therein; the PCB 230, the battery, the memory, the input unit, the wireless fidelity (Wi-Fi) module, the sensor, the audio circuit, the processor, the projection unit, the shooting unit and other components can be disposed in the chamber 101; and the battery, the memory, the processor and the like can be placed on and electrically connected to the PCB 230.

A radio frequency (RF) circuit can be used to receive and transmit a signal during information transmission and reception or during a call. Especially, when downlink information from a base station is received, the RF circuit sends the downlink information to the processor for being processed, and additionally sends uplink data from the mobile phone to the base station. Usually, the RF circuit includes but is not limited to an antenna, at least one amplifier, a transceiver, a coupler, a low noise amplifier, a duplexer and etc. In addition, the RF circuit can communicate with the network and other devices via wireless communication. The wireless communication can employ any communication standard or protocol, including but not limited to global system for mobile communication (GSM), general packet radio service (GPRS), code division multiple access (CDMA), wideband code division multiple access (WCDMA), long term evolution (LTE), e-mail and short messaging service (SMS).

The memory can be used to store software programs and modules, and the processor runs various software applications and performs data processing by running the software programs and modules stored in the memory. The memory can mainly include a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory can include a high-speed random access memory, and can also include a non-volatile memory, such as at least one disk storage device and flash memory device, or include other volatile solid state memory devices.

The input unit can be configured to receive incoming numbers or character information, and generate a key signal related to user settings and function control of the mobile phone. Specifically, the input unit can include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program.

An outer surface of the housing 100 can be embedded with a display screen and the display screen cover plate 110 covering the display screen. The display screen can be configured to display information input by the user or information provided to the user and various menus of the mobile phone. In addition, the mobile phone can also include at least one sensor, such as an attitude sensor, a light sensor and other sensors.

Specifically, the attitude sensor can also be referred to as a motion sensor, and as one of the motion sensors, a gravity sensor can be employed. As for the gravity sensor, a cantilever displacement device is made of an elastic-sensitive element, and an electrical contact is driven by an energystorage spring made of the elastic-sensitive element, so as to achieve the conversion of gravity changes into electrical signal changes.

The audio circuit, the electroacoustic component 210 (the electroacoustic component 210 can be a receiver, a loudspeaker or a handset) and a microphone can provide an audio interface between the user and the mobile phone. The audio circuit can transmit an electrical signal converted from the received audio data to the electroacoustic component 210, and the electroacoustic component 210 converts the electrical signal into an audio signal to be output. The microphone converts the audio signal collected into the electrical signal; the audio circuit receives and converts the electrical signal into the audio data, and transmits the audio data to the processor. After processed by the processor, the audio data is sent to another mobile phone via the RF circuit, or output to the memory for further processing.

Wi-Fi is a short distance wireless transmission technology, and the mobile phone can help the user send and receive e-mails, browse websites and access streaming media through the Wi-Fi module which provides the user with wireless broadband access to the Internet.

The processor is a control center of the mobile phone, is connect to various parts of the mobile phone by means a variety of interfaces and lines to, and performs various functions of the mobile phone and data processing by running or executing software programs and/or modules stored in the memory and by invoking the data stored in the memory, so as to monitor the mobile phone overall. In at least one embodiment, the processor can include one or more processing units; preferably, the processor can be integrated with an application processor and a modem processor, in which the application processor mainly handles the operating system, the user interface and the application program, while the modem processor mainly deals with wireless communication.

Embodiment 1

As illustrated in FIGS. 1 to 2, in this embodiment, the housing 100 for the mobile phone includes the display screen cover plate 110, the front cover 120, the first dustproof mesh 130 and the rear cover 140. The display screen cover plate 110 is provided with the through hole 111 and is embedded in an outer surface of the front cover 120, and the sound output hole 123 is provided in the front cover 120. As illustrated in FIG. 2, the sound output hole 123 is opposite to and in communication with the through hole 111, and hence the sound can be transmitted outside the housing 100 through the sound output hole 123. The first dustproof mesh 130 is interposed between the front cover 120 and the display screen cover plate 110 to make the through hole 111 spaced apart from the sound output hole 123, thus preventing the impurities (such as dust) from entering the sound output hole 123.

Further, as illustrated in FIG. 2, the first dustproof mesh 130 can have the bent portion 131, and the bent portion 131 extends into the through hole 111 to further prevent the impurities (such as dust) from entering the sound output hole 123. As illustrated in FIG. 2, the housing 100 defines the embedding groove 126 at the side wall towards the display screen cover plate 110, and the edge of the first dustproof mesh 130 can be embedded into the embedding groove 126, such that the structure of the housing 100 becomes more compact and reasonable. As illustrated in FIGS. 1 and 3, the rear cover 140 and the front cover 120 define the chamber 101, and the mounting chamber 121 is defined in the front cover 120 and is in communication with the chamber 101.

A surface of the front cover 120 towards the chamber 101 defines the mounting chamber 121 configured to accommodate the electroacoustic component 210. The mounting chamber 121 is in communication with the chamber 101, and the sound output hole 123 is in communication with the mounting chamber 121. When assembled, the sound output portion 211 of the electroacoustic component 210 can be arranged opposite to the sound output hole 123, such that the sound from the electroacoustic component 210 can be transmitted out smoothly through the sound output hole 123. As illustrated in FIG. 2, the second dustproof mesh 220 is provided between the electroacoustic component 210 and an inner wall of the mounting chamber 121, and is adhered to the front cover 120 through the adhesive layer 221, so as to further prevent the impurities (such as dust) from entering the mounting chamber 121.

As illustrated in FIGS. 1 to 2, the sound output hole 123 can include the first hole segment 124 and the second hole segment 125. The first end of the first hole segment 124 is constructed as the first opening 124a in communication with the mounting chamber 121; the first end of the second hole segment 125 is in communication with the second end of the first hole segment 124; and the second end of the second hole segment 125 is constructed as the second opening 125a. the second opening 125a is in communication with a first end of the through hole 111, and a second end of the through hole 111 is in communication with the outside ("the outside" here should be interpreted in a broad sense, and refer to a space spaced apart from the mounting chamber 121 and located outside the mounting chamber 121). The cross sectional area of the first hole segment 124 is larger than the cross sectional area of the second hole segment 125, such that the first hole segment 124 can be utilized to collect the sound and transmit the sound outside the mounting chamber 121, and the second hole segment 125 can be utilized to keep the impurities (such as dust) outside the housing 100 and prevent the impurities (such as dust) from accumulating in the sound output hole 123 and blocking the sound output hole 123, thereby improving the dustproof performance of the housing 100, and reducing the blockage of the housing 100 against the sound output.

As illustrated in FIG. 2, the first hole segment 124 and the second hole segment 125 are configured as circular holes, and the cross sectional area of the first hole segment 124 and that of the second hole segment 125 are both constant. That is, the cross sectional area of the first hole segment 124 at any position is S1, and the cross sectional area of the second hole segment 125 at any position is S2, in which S1>S2. Therefore, the machining process can be simplified, and the production cost can be saved. It is verified through tests that when S1 and S2 satisfy $0.2 \leq S2/S1 \leq 0.3$, a better effect of preventing the dust from accumulating at the sound output hole 123 can be achieved, and the blockage of the housing 100 against the sound output is further reduced.

Embodiment 2

As illustrated in FIGS. 3 to 4, different from Embodiment 1, in this embodiment, in the direction from the first opening 124a to the second opening 125a, the cross sectional area of the first hole segment 124 is gradually decreased. Thus, it is not only possible to effectively prevent the dust from accumulating at the sound output hole 123, thereby reducing the possibility that the impurities (such as dust) block the sound output hole 123, but also the sound output area is increased, thereby reducing the blockage of the housing 100 against the sound output.

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. Thus, the appearances of the above phrases throughout this specification are not necessarily referring to the same embodiment or example of the present disclosure. Furthermore, the particular features, structures, materials, or characteristics can be combined in any suitable manner in one or more embodiments or examples. Moreover, different embodiments or examples as well as the features in the different embodiments or examples described in the specification can be combined or united by those skilled in the related art in the absence of contradictory circumstances.

Although embodiments of the present disclosure have been illustrated and illustrated, it shall be understood by those skilled in the art that the above embodiments are explanatory and cannot be construed to limit the present disclosure, and changes, modifications, alternatives and variants can be made in the embodiments without departing from the scope of the present disclosure.

What is claimed is:

1. A housing for a terminal, comprising:
   a front cover having an inner top wall and inner side walls, the inner top wall and the inner side walls cooperatively defining a mounting chamber configured to accommodate an electroacoustic component, the inner top wall defining a sound output hole in communication with the mounting chamber, the sound output hole having a first end and a second end, the first end being adjacent to the mounting chamber and defining a first opening, the second end being away from the mounting chamber and defining a second opening, and the first opening being larger than the second opening; and
   a display screen cover plate defining a through hole and embedded in the front cover, and the sound output hole being opposite to and in communication with the through hole.

2. The housing according to claim 1, wherein the first opening has a cross sectional area larger than a cross sectional area of the second opening.

3. The housing according to claim 1, wherein the sound output hole comprises:
   a first hole segment having a first end and a second end, the first end being constructed as the first opening; and
   a second hole segment having a first end in communication with the second end of the first hole segment, and a second end constructed as the second opening, wherein a cross sectional area of the first hole segment is larger than a cross sectional area of the second hole segment.

4. The housing according to claim 3, wherein in a direction from the first opening to the second opening, the cross sectional area of the first hole segment is gradually decreased.

5. The housing according to claim 3, wherein the cross sectional area of the first hole segment and the cross sectional area of the second hole segment are both constant.

6. The housing according to claim 3, wherein the first hole segment and the second hole segment are configured as circular holes.

7. The housing according to claim 1, wherein a cross sectional area of the first opening is S1, and a cross sectional area of the second opening is S2, S1 and S2 satisfying $0.1 \leq S2/S1 \leq 0.4$.

8. The housing according to claim 7, wherein S1 and S2 satisfy $0.2 \leq S2/S1 \leq 0.3$.

9. The housing according to claim 1, further comprising:
   a first dustproof mesh interposed between the front cover and the display screen cover plate to make the through hole spaced apart from the sound output hole; and
   a rear cover, wherein the rear cover and the front cover together define a chamber, and the mounting chamber is in communication with the chamber.

10. The housing according to claim 9, wherein the first dustproof mesh has a bent portion, and the bent portion extends into the through hole.

11. The housing according to claim 9, wherein the housing defines an embedding groove at a side wall towards the display screen cover plate, and the first dustproof mesh has an edge embedded into the embedding groove.

12. A terminal, comprising:
   a housing comprising:
     a front cover having an inner top wall and inner side walls, the inner top wall and the inner side walls cooperatively defining a mounting chamber configured to accommodate an electroacoustic component, the inner top wall defining a sound output hole in communication with the mounting chamber, the sound output hole having a first end and a second end, the first end being adjacent to the mounting chamber and defining a first opening, the second end being away from the mounting chamber and defining a second opening, and the first opening being larger than the second opening;
     a display screen cover plate defining a through hole and embedded in the front cover, and the sound output hole being opposite to and in communication with the through hole; and
     a first dustproof mesh having a protruding portion extending into the through hole and a flange sandwiched between the front cover and the display screen cover plate;
   an electroacoustic component having a sound output portion and embedded in the mounting chamber, the sound output portion of the electroacoustic component being corresponding to the sound output hole; and
   a second dustproof mesh attached to the sound output portion.

13. The terminal according to claim 12, wherein an adhesive layer is provided between the second dustproof mesh and the electroacoustic component.

14. A mobile phone, comprising:
   a housing;
   a printed circuit board (PCB);
   a memory;
   an input unit;
   a sensor; and
   an electroacoustic component;
   the housing defining a chamber, the PCB, the memory, the input unit and the sensor being arranged in the chamber, and the memory being arranged on and electrically connected to the PCB,
   the housing comprising:
     a front cover having an inner top wall and inner side walls, the inner top wall and the inner side walls cooperatively a mounting chamber configured to accommodate the electroacoustic component, the inner top wall defining a sound output hole in communication with the mounting chamber, the sound output hole having a first end and a second end, the first end being adjacent to the mounting chamber and defining a first opening, the second end being away from the mounting chamber and defining a second opening, and the first opening being larger than the second opening a display screen cover plate defining a through hole and embedded in the front cover, and the sound output hole being opposite to and in communication with the through hole; and a dustproof mesh having a protruding portion extending into the through hole and a flange sandwiched between the front cover and the display screen cover plate.

15. The mobile phone according to claim 14, wherein the electroacoustic component is electrically connected to the PCB.

16. The mobile phone according to claim 14, wherein the electroacoustic component is configured to be one of a receiver, a loudspeaker or a handset.

17. The mobile phone according to claim 14, wherein the sensor is configured to be at least one of an attitude sensor or a light sensor.

18. The mobile phone according to claim 14, wherein the housing has an outer surface embedded with a display screen and a display screen cover plate covering the display screen.

19. The mobile phone according to claim 14, wherein the memory is configured to be a high-speed random access memory.

20. The mobile phone according to claim 14, wherein the input unit comprises a touch panel.

* * * * *